Figure 2B:
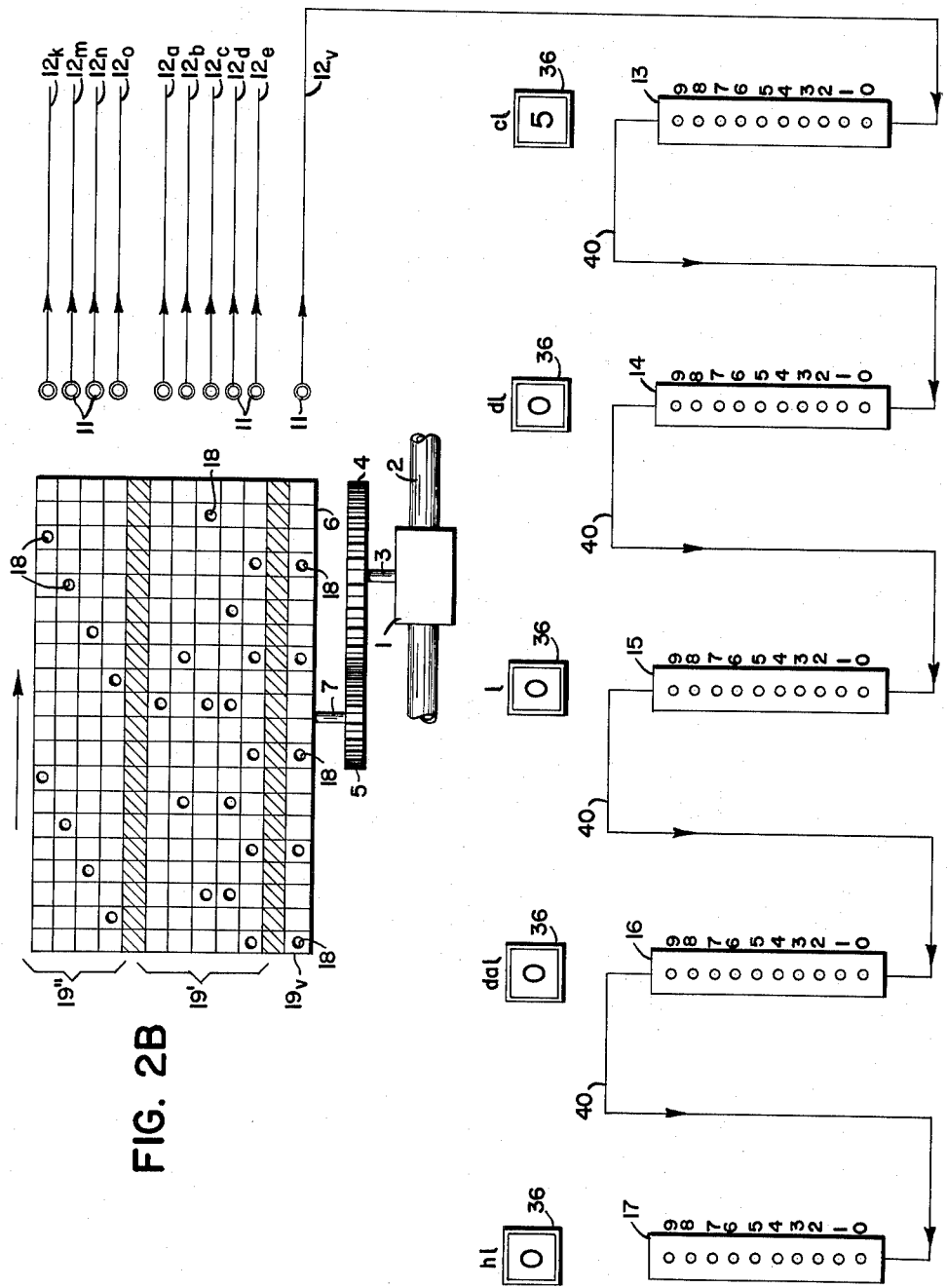

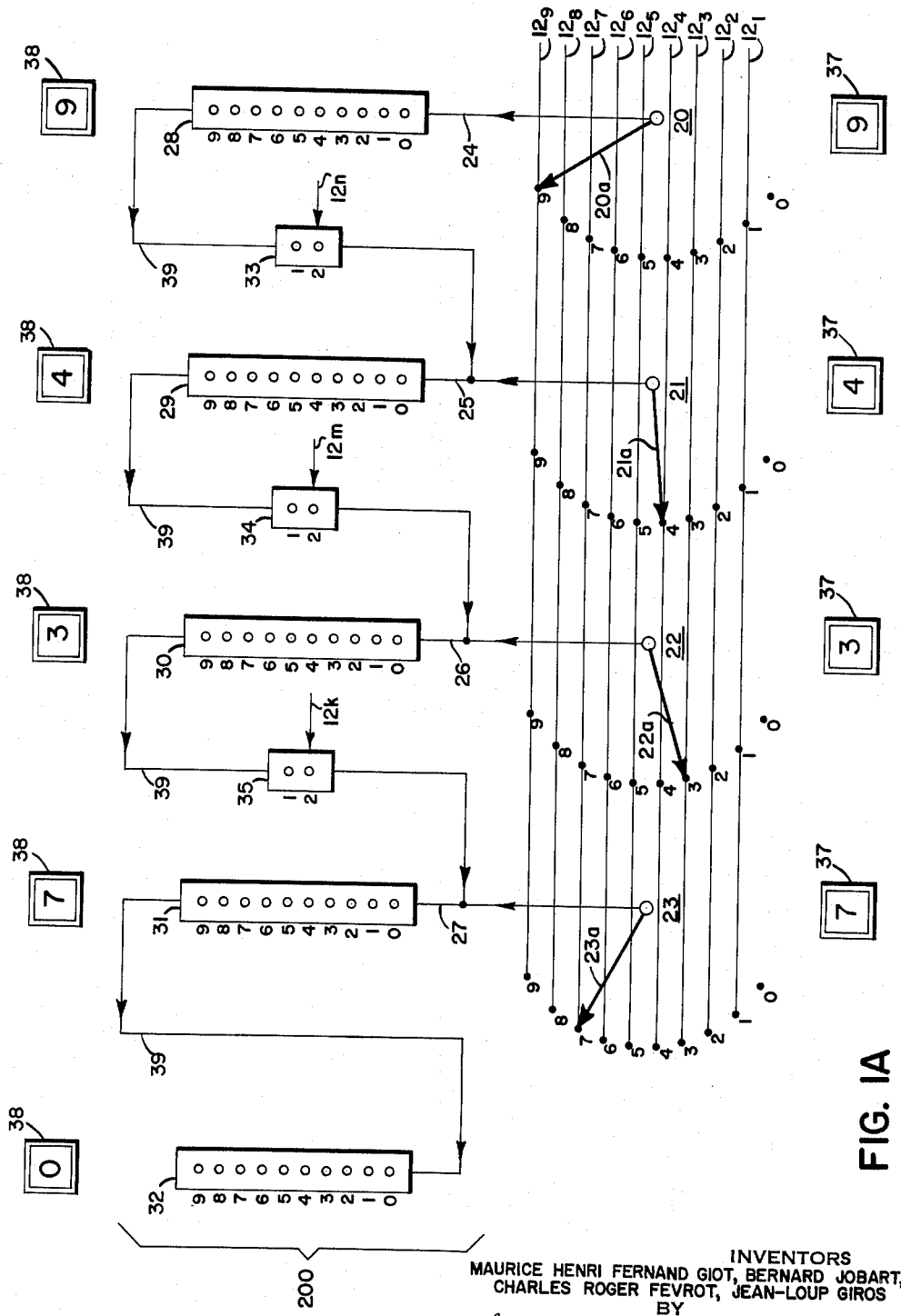
FIG. IA
INVENTORS
MAURICE HENRI FERNAND GIOT, BERNARD JOBART,
CHARLES ROGER FEVROT, JEAN-LOUP GIROS
BY
ATTORNEY

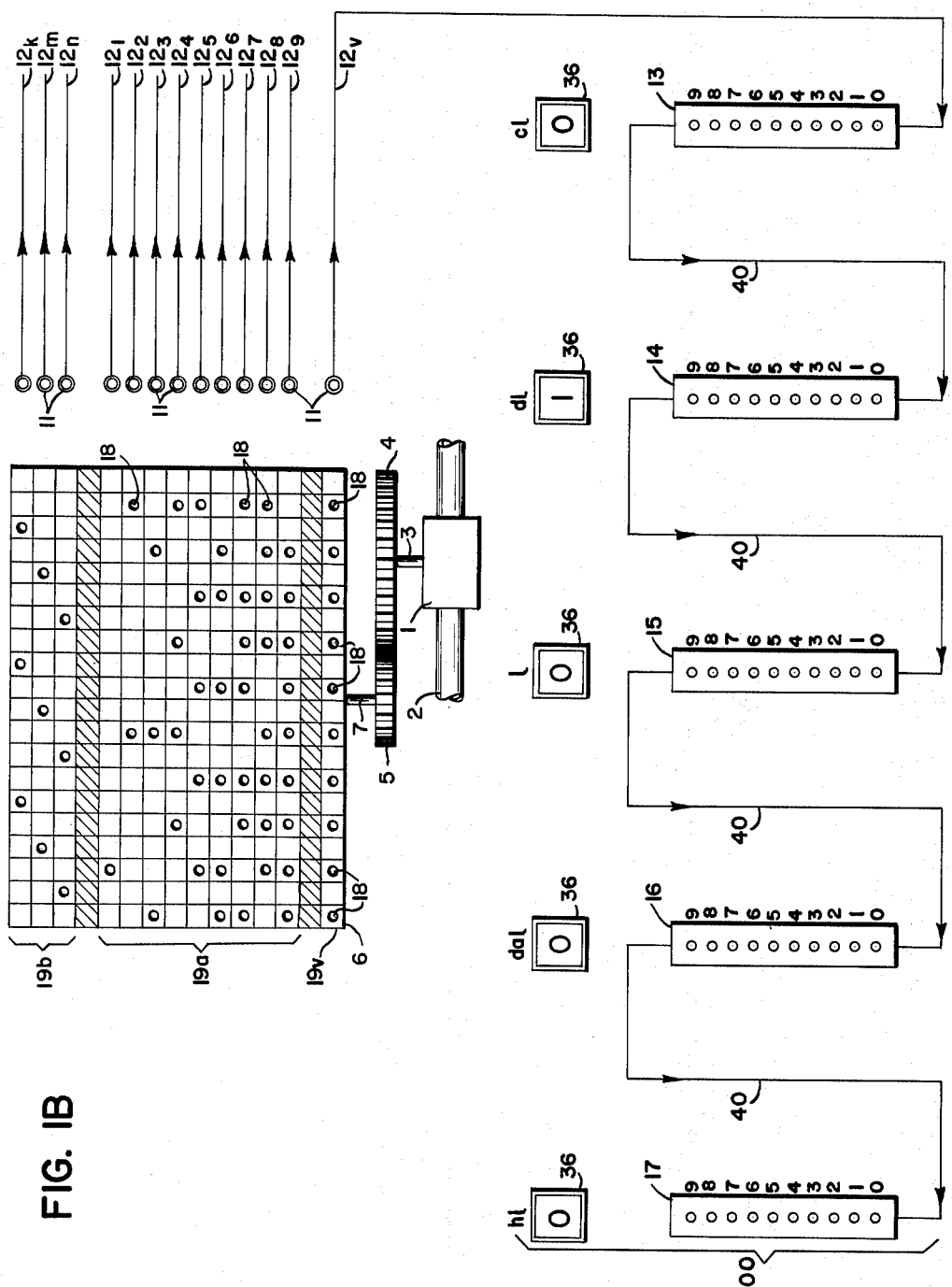

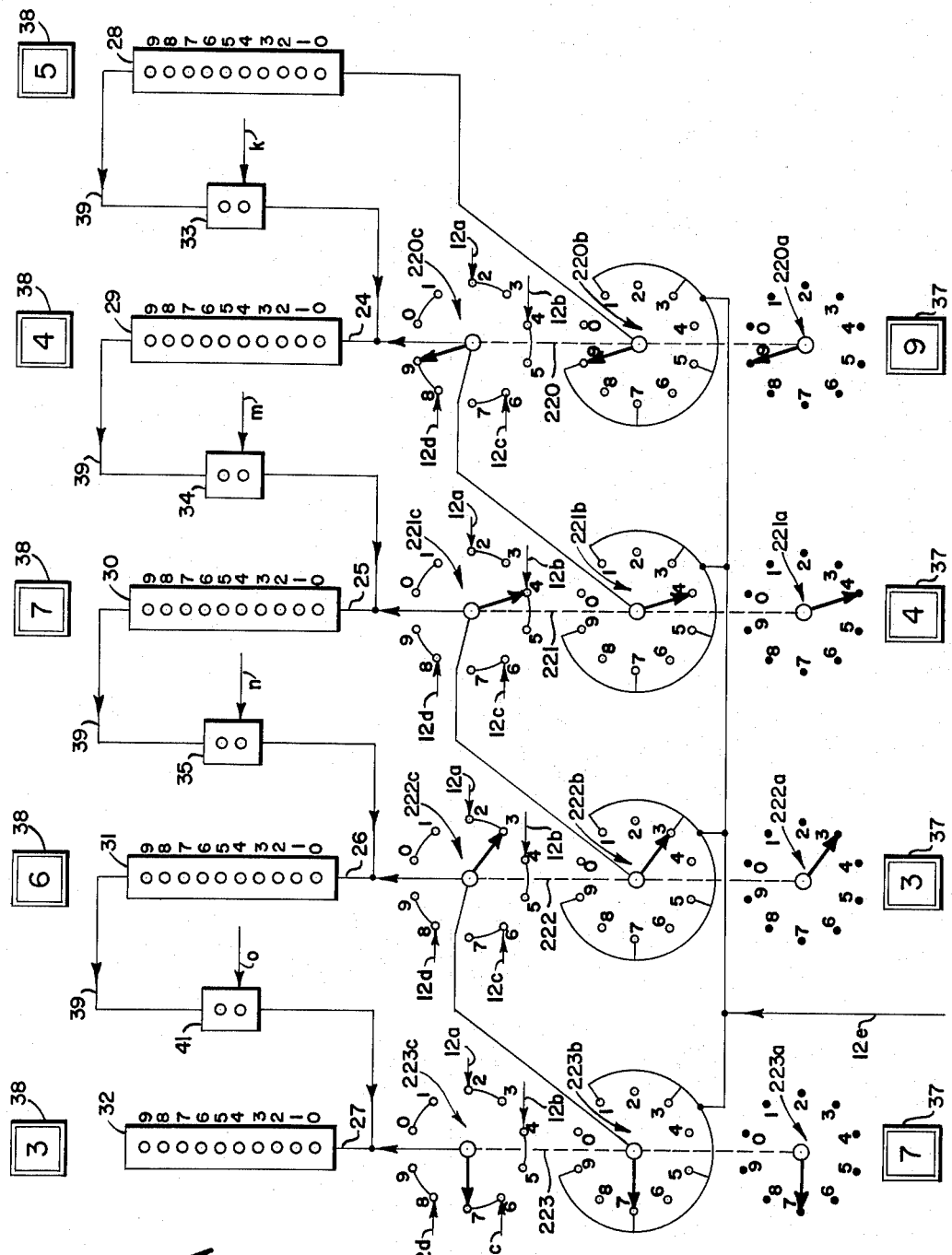

Dec. 21, 1965 M. H. F. GIOT ET AL 3,225,178
METERING AND COMPUTING APPARATUS
Filed July 27, 1962 5 Sheets-Sheet 4

INVENTORS
MAURICE HENRI FERNAND GIOT, BERNARD JOBART,
CHARLES ROGER FEVROT, JEAN-LOUP GIROS
BY
ATTORNEY

United States Patent Office 3,225,178
Patented Dec. 21, 1965

3,225,178
METERING AND COMPUTING APPARATUS
Maurice Henri Fernand Giot, Bernard Jobart, Charles Roger Fevrot, and Jean-Loup Giros, Paris, France, assignors to S.A.T.A.M. Societe Anonyme pour Tous Appareillages Mecaniques, Paris, France, a French company, and to Sud-Aviation, Societe Nationale de Constructions Aeronautiques, Paris, France, a French company
Filed July 27, 1962, Ser. No. 212,884
2 Claims. (Cl. 235—92)

The present invention relates to automatic measuring apparatus in which the indications of the quantity measured such as, for example, weight or volume, and of a quantity proportional thereto which is a function of a parameter of the material measured such as for example its density or price per unit volume, are intended to be read by the user and are moreover electrically controlled. The apparatus of the invention may be used in particular in a liquid dispensing system for distribution of fluids such as hydrocarbon fuels.

Fuel distributors in which the volume of liquid delivered and the accumulated sales price of the liquid so delivered are automatically displayed throughout the course of the delivery are well known. Such distributors usually operate by means of mechanical devices which are of a complicated nature and in which the various necessary elements of structure are grouped together as a consequence of the use of mechanical transmissions between them.

It has already been proposed, in order to permit separation of these elements, to replace the mechanical structure by means of electronic devices, and in particular to insert into the delivery line between the pump and the flexible hose a volumetric meter which drives two disks developing by means of photoelectric cells two distinct series of pulses, of which one is destined for the price indication and the other for the volume or quantity indication.

Such an arrangement makes it necessary to change the disk which develops the price impulses every time the unit price of the fuel is changed. Consequently it is necessary to open the explosion-proof casing in which this disk is mounted in order to replace it with another corresponding to the new price, which other disk or disks must of course be available on hand.

Moreover, there is no permanent or necessary connection between the unit price displayed and the totalized price actually generated, which involves the possibility of falsification. Thus, it may be that the disk which is coupled to the volume counter for generation of price impulses does not correspond to the displayed unit price.

In order to mitigate these disadvantages, it has been proposed to provide a pulse transmitting device having a single output, whose pulses are developed as a function of the volume delivered, and to employ these pulses to operate a delivered indicating device and also to operate via appropriate calculating devices a device for indication of the sales price corresponding to the volume delivered.

Such an arrangement is described in the co-pending application Serial No. 190,151, filed April 25, 1962, which is assigned to the assignee hereof, and in particular in FIGS. 2 and 4 thereof, in which the calculating devices take the form of a counting ring which receives directly from the volume pulse developing device a number of pulses such that the cycle of the ring counter is completed upon each delivery of the minimum volume whose delivery is authorized by the appropriate public authorities to be made. This ring counter develops pulses and delivers them to the counters of the various digital (i.e. usually decimal) orders of a pulse totalizator which develops therefrom and effects by suitable associated means display of the totalized or accumulated sales price.

The present invention provides measuring and computing apparatus, for example for use in a fluid distribution system, in which the pulse generator and the ring counter whose cycle is completed for each multiple of the minimum deliverable volume are combined into a single unitary structure which is mechanically driven by the liquid passing through the delivery line.

This unitary structure comprises a mechanically driven pulse generator, coupled directly to the volumetric measuring device in the delivery line. The pulse generator comprises a drum driven by the shaft of this volumetric measuring device. The cylindrical surface of the drum is pierced with several series of holes, the holes of each series being disposed in a separate plane perpendicular to the axis of rotation of the drum. In each of these planes, there is disposed a photoelectric cell on one side of the drum (i.e. on the inside or outside of it) and a luminous source on the other side of the cylindrical surface of the drum. When the drum is rotated, each photoelectric cell develops for each revolution of the drum as many pulses as there are holes in the plane with which the cell is associated. The several independent series of pulses thus obtained are applied in parallel to the counters in the various decimal orders of the pulse totalizator which is provided for indication of the totalized sales price. Appropriate switching means are provided to select the photocells corresponding to the various digits of the price per unit volume.

Figure 3:
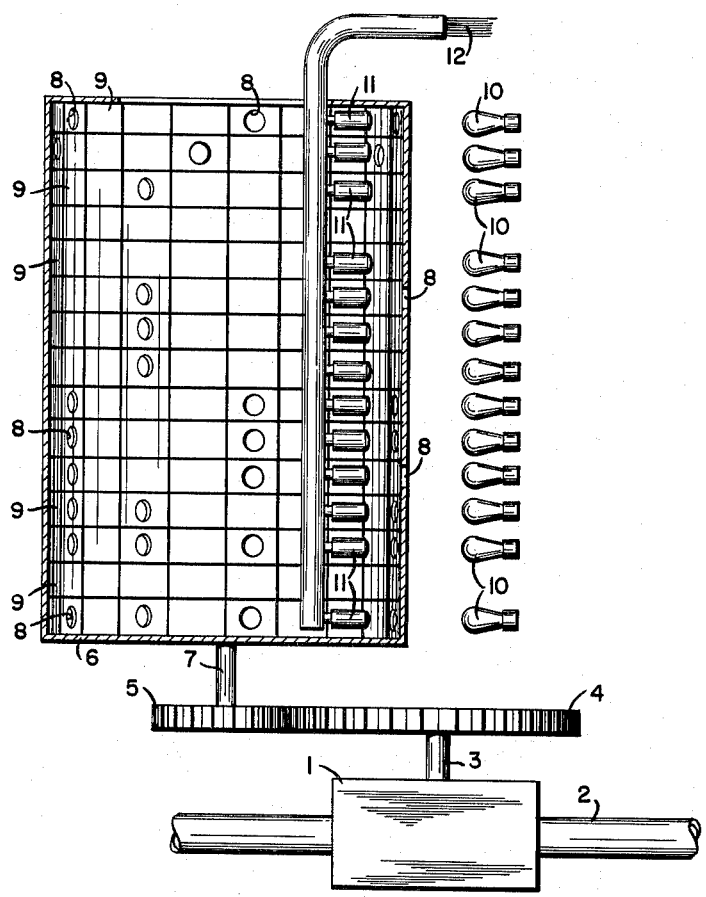

The invention will now be further described with reference to the accompanying drawings in which:

FIGS. 1a and 1b together constitute a schematic diagram illustrating one embodiment of the invention;

FIGS. 2a and 2b together constitute a diagram similar to that of FIGS. 1a and 1b but representing a modified embodiment of the invention; and FIG. 3 is a detail view illustrating the pulse developing drum in the apparatus of FIGS. 1a and 1b.

Referring to FIGS. 1b and 3, it may be seen that the apparatus of the invention comprises a volumetric meter 1 disposed in a fluid delivery line 2. The shaft 3 of this meter is coupled with the shaft 7 of the drum through gearing comprising the elements 4 and 5. The gears 4 and 5 may for example be so proportioned that the shaft 7 executes ten revolutions for each revolution of the shaft 3, each revolution of shaft 3 corresponding for example to the delivery of one liter through line 2.

In FIG. 1b the drum 6 is shown in developed form. In reality it is, of course, cylindrical in shape as illustrated in the sectional view of FIG. 3. FIG. 3 shows that the drum is hollow and that it is provided in its cylindrical side wall with holes 8 which are disposed in separate groups or series, the holes of each series lying in a separate plane circular row 9.

Luminous sources as indicated at 10 and photoelectric cells 11 are disposed on opposite sides of the cylindrical wall of the drum in such fashion that the light from each of the sources 10 may pass through the holes 8 in one of the planar rows 9 to actuate the photocell 11 of that row. In consequence of the rotary motion of the drum, the illumination of the cells 11 by the holes 8 corresponding thereto is of brief duration and there is accordingly generated by the passage of each such hole a pulse in the corresponding one of the photocells 11. The output circuits of the cells are indicated schematically at 12. In the developed view of the drum in FIG. 1b the planar rows 9 of the holes 8 are identified as separate rows or series of holes 19a (including nine series), three rows 19b, and one row 19v, i.e. a total of thirteen rows. The holes identified in FIG. 3 at reference characters 8 are identified in the developed view of FIG. 1b by means of reference character 18.

In FIG. 1b, the first series 19v comprises ten holes 18. Upon one rotation of the shaft 3, with drum 6 making ten revolutions, each of the holes 18 in the array 19v passes ten times in front of the associated luminous source 10 (FIG. 3). Thus the photocell 11 associated with this series develops 100 pulses per revolution of the shaft 3. Assuming one rotation of the shaft 3 to correspond to one liter of delivered fluid, this means one pulse per centiliter.

These pulses are delivered via the output channel $12v$ toward the volume totalizating device, generally indicated at 100.

This device may comprise in known fashion the decade or count of ten counters 13, 14, 15, 16, and 17, each of which is allocated to a distinct decimal order in the totalized volume. These decade counters are connected to each other so that the decade 13 of lowest order receives all of the pulses from line $12v$, the others receiving each only the carries from the counter of adjacent lower order.

These decade counters and the mode of interconnection between them as indicated by the conductors 40 to make up a totalized volume indicating device are disclosed in said co-pending application Serial No. 190,151 filed April 25, 1962. The decade counters 13 to 17 are moreover each coupled to a suitable display device for display of the count in such counter. The display device is indicated schematically in FIG. 1b in the form of a window 36 through which, as by means of ten lamps coupled to the separate counting tubes of the corresponding one of decades 13 to 17, the instantaneous count of such decade is displayed.

The nine parallel rows 19a in FIG. 1b comprise each as many holes 18 as correspond to their ordinal position. Thus, one of them includes nine holes, the next eight, the next seven, and so on, the last or ninth one including a single hole only.

As the drum 6 effects one rotation, the photoelectric cells 11 associated with rows 19a thus develop plural series of pulses, one series including nine pulses, the next including eight, and so on until the ninth or last series includes one pulse only.

These pulse series are delivered via output lines $12_1$ to $12_9$ to the switches indicated at 20, 21, 22 and 23 in FIG. 1a, the subscripts indicating the number of pulses in the pulse series on each such line.

For purposes of simplification, the lines $12v$, $12_9$ to $12_1$ and three lines $12_k$, $12_m$, and $12_n$ presently to be mentioned are shown broken in the drawing. Their connections between FIGS. 1a and 1b, and similarly between FIGS. 2a and 2b are, however, indicated by the use of the same corresponding reference characters.

The switches 20 to 23 include central rotatable element or movable contacts 20a to 23a respectively arranged to make contact selectively with nine stationary input contacts numbered 1 to 9, which are connected respectively to the pulse lines $12_1$ to $12_9$. In addition a tenth position is defined for each of the movable contacts 20a to 23a by a zero stationary contact, not electrically connected to any of the output channels from the pulse developing structure associated with the drum 6. The movable contacts 20a to 23a connect respectively to pulse output lines 24 to 27 which deliver pulses to count of ten ring counters 28 to 31 respectively in an aggregate sales price totalizer 200.

In the example shown, the unit price has been arbitrarily assumed by way of example to be 73.49 francs for a 10 centiliter unit volume. Consequently, the movable contact 23a of switch 23 is set to the seventh stationary contact of that switch and thereby in connection with the pulse output line $12_7$ from drum 6. In switch 22, the movable contact 22a is set to position 3, thereby effecting connection between pulse output channel $12_3$ and contact 22a of switch 22. In switch 21, the movable contact 21a is set to position 4 so that pulse delivery line $12_4$ is connected to the contact 21a of switch 21. In switch 20 the movable contact 20a is set to position 9 so that pulse delivery line $12_9$ is connected to the contact 20a of that switch.

The movable contacts 20a to 23a of the switches 20 to 23 may be coupled to pointers or other display devices of any desired type, either mechanical or electrical. In the drawing, display windows 37 are shown with each of which there is associated a plurality of ten lamps, an appropriate one of these lamps being selected by electrical means coupled to the movable contacts 20a to 23a so that each of the windows 37 displays the digit representing the instantaneous position of the movable contact of that switch.

As the drum 6 makes one revolution, the movable contacts of the switches 20 to 23 receive respectively numbers of pulses corresponding to the positions to which those movable contacts have respectively been set.

The "decade" counters 28 to 31 may take the form of ten tube ring counters of the type illustrated in FIG. 9 of said copending application Serial No. 190,151. For simplicity in FIGS. 1a, 1b, 2a and 2b of the drawings these decade counters are shown as rectangles including ten small circles representing their ten counting tubes. Each of the decade counters 28 to 31 is in turn coupled to a suitable display device which may take the form of a window 38 through which there is observed an illuminated lamp which indicates the instantaneous count of the counter.

Moreover each of the decade counters 28 to 31 is connected to the next counter of adjacent higher order by a conductor 39, just as the counters 13 to 16 of the volume totalization device 100 are interconnected by way of conductors 40. Further, each time the counter 28 shifts from a count of nine to a count of zero, its zero tube coming into conduction, a carry signal is transmitted via conductor 39 toward the counter 29, and similarly upon passage of the counters 29, 30 and 31 from counts of nine to counts of zero.

A carry pulse may however be developed for delivery over a line 39 to any one of the decades 29, 30 and 31 simultaneously with the arrival of a price pulse over the corresponding one of lines 25, 26 and 27. Thus it will be observed in FIG. 1b that the holes 18 are arranged not only in rows 19a, 19b and 19v but in columns as well, one column for each of the ten holes 18 which are provided in row 19v for the development of delivered volume pulses, these columns conforming, in the cylindrical shape of the drum in FIG. 3, to elements of that cylindrical surface. In fact, each time a pulse is developed in the ninth row 19a (which ninth row contains nine holes 18), at least three pulses are developed in others of the rows 19a, and, more generally, every time a pulse is developed in any of the rows 19a, at least three pulses are developed in others of the rows 19a. These plural simultaneous pulses thus appear on plural of the output lines $12_1$ to $12_9$ and one thereof may readily cause the development of a carry pulse in one of the decade counters 28, 29 and 30 while another one of them is delivered via line 25, 26 or 27 to the pulse output to the decade counter 29, 30 or 31 of adjacent higher order.

Means are therefore provided to prevent the effective suppression of one of such simultaneously arriving pulses which would otherwise occur.

These means comprise bi-stable circuits constituting count-of-two ring counters or "memories" 33, 34 and 35 which are inserted into the carry lines 39. The devices 33, 34 and 35 may be of the type described in said copending application Serial No. 190,151. The shift or read-out pulses for these memories are derived via channels $12_k$, $12_m$ and $12_n$ which receive pulses from photocells 11 disposed adjacent to holes 18 in rows 19b of the drum 6, the holes 18 of rows 19b being disposed in columns of the drum surface not including any holes of the rows 19a.

The operation of the apparatus illustrated in FIGS. 1a and 1b is as follows:

When the fluid being delivered flows through the line 2, the volumetric meter 1 rotates the shaft 3 at the rate of one revolution per liter of delivered fluid. By operation of the gears 4 and 5 the drum 6 is caused to make ten revolutions per liter. The rotation of the drum results in the generation in each of the photocells of a pulse every time a hole 18 passes between such cell and the luminous source 10 therefor shown in FIG. 3.

Since the row $19v$ of the drum is provided with ten holes, the channel $12v$ delivers ten pulses per rotation of the drum, i.e., one pulse per centiliter. In similar fashion the channel $12_9$ delivers nine pulses per drum rotation, the channel $12_8$ delivers eight pulses per drum rotation, and so on.

The pulses from channel $12v$ are delivered to the volume decade counter 13 of lowest order in volume totalizer 100, which counter is accordingly stepped through its cycle, its instantaneous count being displayed in the corresponding window 36. When ten centiliters have been delivered, i.e., upon rotation of the drum 6 through one revolution, a carry pulse is delivered to the decade counter 14 upon the consequent shift of conduction from the 9-tube to the 0-tube of counter 13 and the cycle of counter 13 begins again. The 1-tube in the ring counter 14 will accordingly be made conducting and the digit one will be displayed in the window 36 of the second lowest order of the volume totalizer. If the delivery is of 130 centiliters, 130 pulses will have passed through channel $12v$ into the counter 13 with 13 pulses passing into the counter 14 and one into the counter 15. At the end of the delivery the zero tube of counter 13 will be lighted with corresponding display of the digit zero in the associated window 36. In counter 14 the 3-tube will be conducting and the digit 3 will be displayed in its window 36. In decade 15 the 1-tube will be conducting and the digit one will be displayed in its window 36.

The volume totalizer will thus display the number 130, corresponding within an error of plus or minus one centiliter to the quantity actually delivered.

Each time that the drum 6 makes a complete revolution, nine pulses are delivered to the line $12_9$, eight to the line $12_8$ and so on. For delivery of 130 centiliters, the drum will make 13 revolutions.

While the drum is making the first revolution, the price decade counter 28 will receive via line 24 nine pulses from line $12_9$, switch 20 being at position 9. During this same time interval the price decade counter 29 of adjacent higher order will receive four pulses from line $12_4$, switch 21 being on position 4. In similar fashion the decade counters 30 and 31 will receive three and seven pulses respectively from lines $12_3$ and $12_7$. The pulses delivered to lines $12_1$, $12_2$, $12_5$, $12_6$ and $12_8$ are not used.

Three pulses are delivered via each of lines $12_k$, $12_m$ and $12_n$ to the bi-stable memories 33, 34 and 35 respectively but these pulses are without effect since these devices have not been stepped by carry pulses from any of counters 28, 29 and 30 to cause conduction in their number two tubes.

In decade 28 the ninth tube conducts and the digit 9 is displayed in the corresponding window 38. Similarly in decades 29 and 30, the fourth and third tubes conduct with display of the digits 4 and 3 in their windows 38. In decade 31 the seventh tube conducts and the digit 7 is displayed.

At the end of the first revolution of the drum, the volume display device 100 thus indicates a delivery of ten centiliters whereas the sales price display device 200 indicates an aggregate sales price of 73.49.

As the drum makes a second revolution, the decade 28 receives again nine pulses. It is consequently stepped through the end of its first cycle and passes in its second cycle as far as a count of eight, in which tube number eight conducts. When at the end of the first cycle conduction shifts from its 9-tube to its 0-tube, a carry pulse is delivered over line 39 to the device 33, shifting conduction there from tube number one to tube number two. This pulse shifts conduction in device 33 from tube number one to tube number two and pre-ionizes tube number one, but does not effect the transmission of a pulse from the device 33 to the decade 29. The carry pulse from decade 28 is transmitted on to the decade 29 only upon the arrival of a separate pulse via line $12_n$, shifting conduction in the device 33 back to tube number one, effecting transmission of a pulse to decade 29, and pre-ionizing tube number two in device 33. Device 33 is thus again ready to receive and store a carry pulse from decade 28. The shift pulses on lines $12_k$, $12_m$ and $12_n$ being displaced in time with respect to the pulses in channels $12_1$ to $12_9$, time coincidence of the carry pulses and shift pulses cannot occur. In decade 28 it is therefore tube number eight which conducts, and the digit eight is displayed in the associated window 38.

During the second revolution of the drum the decade 29 receives in addition to the carry pulse from decade 28 four pulses from line 25. Hence in decade 29 it is tube nine which conducts and it is therefore the digit nine which is displayed in its window 38 of decade 29 at the end of the second revolution of the drum.

The decade 30 receives three pulses from the channel $12_3$ via line 26. Therefore in decade 30, tube six is caused to conduct and the digit six is displayed in the corresponding window 38 at the end of the second drum revolution.

The decade 31 receives (during this second rotation of the drum) seven pulses from channel $12_7$ via switch 23 and conductor 27. Decade 31 therefore completes its cycle and steps through a second cycle to the phase at which its tube number four conducts, delivering in addition a carry pulse to the decade 32. Since the decade 32 is for the storage of carries only and does not receive pulses directly from any one of the channels $12_1$ to $12_9$, no memory device corresponding to the devices 33, 34 and 35 need be inserted into the carry line 39 between decades 31 and 32.

At the end of the second revolution of the drum, the accumulated display of delivered volume in windows 36 is 20 centiliters and the accumulated sales price in windows 38 is 146.98.

The process is repeated for every revolution of the drum 6.

It will be observed however that the indicated sales price is correct only at the completion of an integral number of revolutions for the drum. In other words, the sales price displayed is correct only at each ten centiliter multiple of liquid delivered. In such an installation there is concordance between the volume and the sales price only at every ten centiliters. The embodiment of FIGS. 2a and 2b illustrates a modification of FIG. 1. In FIG. 2b the shaft 7 of the drum makes twenty turns for each rotation of the shaft 3, shaft 3 making one turn per liter delivered.

The row $19v$ of holes 18 is provided in FIG. 2b with five holes only. Accordingly with the gear ratio just described, the line $12v$ receives five pulses per drum rotation and therefore as in FIG. 1b, one pulse per centiliter.

In place of the nine parallel rows $19a$ of FIG. 1b there are provided in the embodiment of FIG. 2b five rows 19' of which one includes five holes, the next four, and the other, three, two and one respectively. When the drum 6 makes one complete revolution, there are therefore delivered five, four, three, two and one pulses to the channels 12–e, 12–d, 12–c, 12–b and 12–a respectively.

Since the sales price displayed can be correct only at the completion of each revolution for the drum, the aggregate sales price will be exact in the embodiment of FIG. 2 only for multiples of five centiliters as is required by the public authorities in some countries. In some countries the minimum quantity which may be offered for sale is required to be a centiliter whereas in others it is a larger quantity; for example, five centiliters.

In the latter case it is necessary that each time the drum makes a complete revolution, corresponding to a delivery of five centiliters, the price totalizator must indicate the corresponding sales price, derived as the multiplication by five of the price per unit volume, which unit volume (e.g., a centiliter) is not the minimum volume for which the apparatus must correctly compute the aggregate sales price.

To effectuate such multiplication, there is disposed between the drum 6 and the decades 28 to 32 a multiplying apparatus which may comprise groups of switches as disclosed in copending application Serial No. 189,167 filed April 20, 1962 which is assigned to the assignee hereof and in particular in FIG. 5 of the drawings of that application. See FIG. 2a of the present application.

This multiplying apparatus operates by division by two, dividing by two the digits displayed in the windows 37 (which indicate the instantaneous positions of the switches 20 to 23). Multiplication by five and division by two are, except for the location of the decimal point, equivalent operations.

As disclosed in said application Serial No. 189,167, this apparatus for multiplication comprises as many multi-deck switches 220 to 223 as there are significant figures in the unit sales price. Each of these switches includes an index 220a to 223a which may be employed to select for display at a window 37 the instantaneous position of the switch, as by means of a series of lamps among which selection is made. Each of these switches includes in addition a $b$-deck and a $c$-deck. The first of these delivers from drum output line $12_e$ for odd numbered positions of the switches, five pulses per drum revolution to the price decade counter of adjacent lower order. The $c$-decks deliver pulses via output lines 24, 25, 26 and 27 of switches 220 to 223 to decade counters 29, 30, 31 and 32 respectively. The ten stationary contacts 0 to 9 of the decks 220c, 221c, 222c and 223c are connected in pairs to the drum output lines $12_a$ to $12_d$ so that the 0 and 1 stationary contacts of those decks receive no pulses, the 2 and 3 contacts receive one, the 4 and 5 contacts receive two, the 6 and 7 contacts receive three, and the 8 and 9 contacts receive four.

By reason of the operation of division by two, it is necessary to provide that the lowest order counter 28 in the price totalizer receive only pulses in multiples of five from deck 220b of switch 220 when switch 220 is set to odd-valued positions, such groups of five pulses representing in decimal form the remainder of the division by two of a number having an odd-valued digit in the units order.

The embodiment of FIGS. 2a and 2b is similar to that of FIGS. 1a and 1b in that the aggregate sales price displayed is correct only at the completion of integral numbers of turns by the drum, i.e., at five centiliter multiples in the quantity of liquid delivered.

The embodiments of FIGS. 1a, 1b and 2a, 2b may of course advantageously include where desired pulse shaping circuits for the preservation and restoration of proper shapes for the pulses. Since such circuits are well known, they have not been shown in the drawings. These embodiments may likewise include diodes or other unidirectionally conducting devices provided to prevent the parasitic circulation of pulses which might interfere with proper functioning of the apparatus.

While the invention has been described herein in terms of a number of preferred embodiments, the invention itself is not limited thereto, being rather set forth in the appended claims, interpreted in the light of this description and the accompanying drawings. For example, the distribution of holes among the rows on the drum may be widely different from that shown consistently with obtaining the desired number of pulses on the various output lines from the drum.

We claim:

1. Metering and computing apparatus comprising a volumetric meter having a rotational output, a drum coupled to said meter for rotation therewith, a plurality of circumferential rows of holes through said drum, each of said rows including a different number of holes, said drum further comprising hole-free areas between said holes along predetermined lines parallel to the axis of said drum, at least one additional circumferential row of holes on said drum, each hole of said additional row being located along a separate one of said predetermined lines, a separate photocell associated with each said row disposed adjacent said drum in position to be illuminated by light passing through the holes of its associated row, a multi-order pulse totalizing means, carry storage means connected between adjacent orders of said pulse totalizing means, means for coupling the output of the photocell associated with said additional row of holes to said carry storage means, and a plurality of multi-position switches arranged to interconnect the outputs of a plurality of the remaining photocells to a plurality of said orders of said totalizing means.

2. Metering and computing apparatus comprising a volumetric meter having a rotational output, a drum coupled to said meter for rotation therewith, a plurality of circumferential rows of holes through said drum, each of said rows including a different number of holes, said drum further comprising hole-free areas between said holes along predetermined lines parallel to the axis of said drum, a plurality of additional circumferential rows of carry transfer holes on said drum, each said carry transfer hole being located along a separate one of said predetermined lines, a separate photocell associated with each said row disposed adjacent said drum in position to be illuminated by light passing through the holes of its associated row, a multi-order pulse totalizing means, separate carry storage means connected between adjacent orders of said pulse totalizing means, means for coupling each photocell associated with a carry storage hole row to a separate one of said carry storage means, and a plurality of multi-position switches arranged to interconnect the outputs of a plurality of the remaining photocells to a plurality of orders of said totalizing means.

References Cited by the Examiner

UNITED STATES PATENTS

| 1,778,374 | 10/1930 | Spielmann | 84—1.18 |
| 1,980,292 | 11/1934 | Potter | 84—1.18 |
| 2,803,448 | 8/1957 | Biebel | 235—151 |
| 3,055,585 | 9/1962 | Bell et al. | 235—151 |

FOREIGN PATENTS

| 244,013 | 6/1909 | Germany. | |

MALCOLM A. MORRISON, *Primary Examiner.*